United States Patent [19]

Kobayashi et al.

[11] Patent Number: 4,764,218
[45] Date of Patent: Aug. 16, 1988

[54] PROCESS FOR THE PREPARATION OF MICRO INORGANIC FOAMED GRANULES

[75] Inventors: Waichi Kobayashi; Kouji Usui; Kinzi Uehori, all of Ube, Japan

[73] Assignee: Ube Industries, Ltd., Ube, Japan

[21] Appl. No.: 882,591

[22] Filed: Jul. 7, 1986

[30] Foreign Application Priority Data

Jul. 9, 1985 [JP] Japan .................. 60-151146

[51] Int. Cl.$^4$ ............................................ C04B 20/06
[52] U.S. Cl. ...................................... 106/409; 501/39
[58] Field of Search ................... 501/39; 106/DIG. 1, 106/309

[56] References Cited

U.S. PATENT DOCUMENTS 3,328,180 6/1967 Ban .............................. 106/DIG. 1
4,602,962 7/1986 Fehlmann ......................... 106/309

FOREIGN PATENT DOCUMENTS 1153388 5/1969 United Kingdom ......... 106/DIG. 1

OTHER PUBLICATIONS

Ceramic Bulletin vol. 55 No. 5 (1976) pp. 504–507.

Primary Examiner—Steven Capella
Attorney, Agent, or Firm—Frishauf, Holtz, Goodman & Woodward

[57] ABSTRACT

A process for the preparation of micro inorganic foamed granules chracterized in that amorphous particles having particle size of not greater than 150 μm recovered from particles of an amorphous residue produced by partial oxidation of coal is heated by introducing the same into a flame or gas at a high temperature, whereby foaming the amorphous particles.

7 Claims, 1 Drawing Sheet

F I G. I
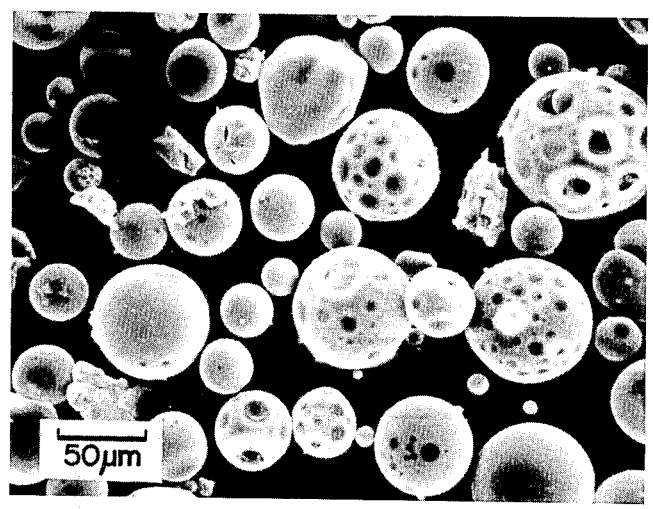

PROCESS FOR THE PREPARATION OF MICRO INORGANIC FOAMED GRANULES

BACKGROUND OF THE INVENTION

1. Field of the Invention

This invention relates to a process for the preparation of micro inorganic foamed granules.

2. Description of Prior Arts

Inorganic foamed granules are lightweight, and have been accordingly used widely as lightweight aggregates for construction of buildings, extenders for fertilizer, detergent or paint, absorbents, soil improvers, etc. Particularly, the micro inorganic foamed granules having a mean particle size of not larger than 500 μm are employed as fillers for imparting heat insulating properties to buildings and adjustors for adjusting specific gravity of cement used for an oil well or geothermal well, in addition to the above usage.

Particularly, the use as adjustor for adjusting specific gravity of cement used for an oil well or geothermal well is one of the quite important uses.

It is required that the micro inorganic foamed granules for employing as specific gravity adjustor should have apparent specific gravity in the range of 0.6 to 0.9 and particle size of not larger than 500 μm (preferably not larger than 200 μm). Further, high strength is required, and the micro inorganic foamed granules having hydrostatic pressure strength of not lower than 300 kgf/cm$^2$ at 70% of indestructibility are generally employed for the above purpose.

The known micro inorganic foamed granules are classified into three groups, that is, granules manufactured from natural volcanic glassy materials, those manufactured from artificial glassy materials and those contained in coal ash.

The micro inorganic foamed granules of natural volcanic glassy materials are produced by the steps of pulverizing materials such as obsidian, pearlite and volcanic ash to make the particle size not larger than 100 μm, removing a portion of fine powder, adding thereto additives such as SiO$_2$ powder and Al$_2$O$_3$ powder in an appropriate amount and firing the mixture at a temperature not lower than 1,000° C.

The micro inorganic foamed granules of natural volcanic glassy materials prepared in the above method generally has a low apparent specific gravity and can be manufactured at relatively low cost. However, hydrostatic pressure strength thereof is extremely low. Therefore, the micro inorganic foamed granules of natural volcanic glassy materials cannot be employed as adjustor for adjusting the specific gravity of cement used for an oil well or geothermal well. The foamed granules are used exclusively as heat insulating materials or lightweight aggregates for construction of buildings, which do not require mechanical strength.

The micro inorganic foamed granules of artificaial glassy materials are produced by steps of adding a foaming compound such as carbon to artificially prepared glassy materials, fusing the mixture and spraying.

The above micro inorganic foamed granules are easily manufactured so as to have the particle size of not larger than 100 μm. The apparent specific gravity and hydrostatic pressure strength of the obtained micro inorganic foamed granules are satisfactory enough to employ as adjustors for adjusting specific gravity of cement used for an oil well or geothermal well. However, manufacturing cost thereof is high.

Inorganic foamed granules contained in coal ash in a very small amount are known. The inorganic foamed granules show favorable properties such as 0.6 to 0.7 of apparent specific gravity and 400 kgf/cm$^2$ of hydrostatic pressure strength (measured at 70% of indestructibility) for employment as adjustor for adjusting specific gravity of cement used for an oil well or geothermal well. However, the foamed granules are generally contained in coal ash in the amount of not more than 0.5 wt.%. For this reason, the foamed granules are not collected industrially in Japan, which makes the granules very expensive.

SUMMARY OF THE INVENTION

An object of the present invention is to provide a process for the preparation of micro inorganic foamed granules having favorable properties such as small particle size, satisfactory strength and low apparent specific gravity at relatively low cost.

Another object of the invention is to provide a new use of residue produced in a coal gasification process, which has not find advantageous use until now.

There is provided by the present invention a process for the preparation of micro inorganic foamed granules which is characterized in that an amorphous residue having a particle size of not larger than 150 μm obtained by partial oxidation of coal is introduced into flame or gas of high temperature, thereby foaming the amorphous residue.

The amorphous residue employed generally contains not more than 65 wt.% of SiO$_2$, not less than 15 wt.% of Al$_2$O$_3$ and not less than 5 wt.% of CaO.

The micro inorganic foamed granules obtained generally have a particle size of not larger than 200 μm.

By the process for the preparation of micro inorganic foamed granules according to the present invention, micro inorganic foamed granules having properties as satisfactory as those of micro inorganic foamed granules of natural volcanic glassy materials micro inorganic foamed granules of artificial glassy materials and micro inorganic foamed granules contained in coal ash, which have been already known, can be produced at a low cost.

The micro inorganic foamed granules prepared by the process of the present invention are strong and light enough to employ as adjustor for adjusting specific gravity of cement used for an oil well or geothermal well.

Further, the process of the invention effectively utilizes amorphous residue produced in a partial oxidation of coal, which has not find advantageous use.

BRIEF DESCRIPTION OF THE DRAWING

FIG. 1 is an electron microscopic photograph showing one example of the structure of the micro inorganic foamed granules of the invention.

DETAILED DESCRIPTION OF INVENTION

The process for the preparation of micro inorganic foamed granules according to the invention is characterized in that amorphous residue having a specific particle size obtained in partial oxidation of coal is introduced into flame or gas of high temperature, thereby foaming the particulate residue.

The amorphous residue is obtained by partial oxidation of coal. An ash obtained upon completely firing a particulate coal does not effectively foam and is not be used for the preparation of the micro inorganic foamed granules of the invention.

The amorphous residue is available as a residue produced by a process of a synthetic gas through partial oxidation of coal. Examples of the process of the preparation of synthetic gas from coal include Lurgi process, Winkler process, Koppers-Totzek process, Otto-Rummel process, KDV process, Lurgi slagging process, Synthane process, WH process, Ugas process, HYGAS process, Japan Coal Technology Institute process, Pressure-fuidizing hydrogenatic gasification process, Hybrid process, HTW process, BIGAS process, Shell(-Shell-Koppers) process, Saarberg-Otto process, Sumitomo process, and Texaco process. In the process of the invention, residues obtained in coal oxidation processs such as Koppers-Totzek process, Otto-Rummel process, Lurgi slagging process, Shell(Shell-Koppers) process, and Texaco process in which the partial oxidation of coal is performed at a temperature of not lower than the softening temperature of the employed coal within a gasification furnace are preferably used.

For instance, Texaco process includes the following procedure: coal is charged into a coal gasification furnace in the form of an aqueous slurry and heated under pressure at a temperature of not lower than the softening temperature of ash of the coal, generally, in the range of 1,300° to 1,500° C., whereby partial oxidation of the coal is done. In this procedure, a melted or half-melted residue is obtained, and this residue is generally cooled with water and exhausted from the coal gasification furnace, if necessary, upon being crushed.

More details of the coal gasification process utilizing Texaco process, etc. are described in Chemical Economy (of Japan), 1981, August and September.

The composition of the residue obtained upon partial oxidation of coal varies with nature of the coal employed in the coal gasification process within certain ranges. However, most of residues obtained upon partial oxidation of coal can be employed as the raw material, regardless of nature of the coal used.

The above-described amorphous residue generally contains not more than 60 wt.% of $SiO_2$ (usually in the range of 30 to 65 wt.%), not less than 15 wt.% of $Al_2O_3$ (usually in the range of 15 to 40 wt.%), and not less than 5 wt.% of CaO (usually in the range of 5–30 wt.%), as well as small amounts of sulfides, other sulfur compounds and unburnt carbon. It is preferred that the amorphous residue contains sulfur in the form of sulfides and unburnt carbon in a total amount of not less than 1 wt.%. In the case that the amorphous residue contains sulfur in the form of sulfides and unburnt carbon in a total amount of less than 1 wt.%, the residue sometimes does not effectively foam.

The residue obtained by partial oxidation of coal is amorphous and shows substantially no specific peak in X ray diffraction pattern.

The particle size of the amorphous residue employed in the invention is not larger than 150 $\mu$m.

The adjustment of the particle size of the amorphous residue collected from a coal gasification furnace can be done by sieving or crushing so as to have a size of not larger than 150 $\mu$m. Crushing is carried out in the usual manner by means of usually employed crushing devices such as a bowl mill. It is not required to remove the residue having extremely small particle size (e.g. smaller than 5 $\mu$m.) contained in the residue which has been sieved or crushed. In order to obtain micro inorganic foamed granules having a particle size within a specific range, the residue having the desired particle size is exclusively employed.

In the case that the residue having a particle size larger than 150 $\mu$m., retention time in the flame or gas of high temperature should be extremely short and thus the amorphous residue does not effectively foam.

The amorphous residue which is thus adjusted with respect to the particle size is then heated by introducing the residue into a flame or gas of high temperature.

The heating process can be performed by, for example, a gas-stream firing method. According to the gas-stream firing method, the fine powder to be fired is introduced together with carrier gas into a flame or gas of high temperature generated in a hot-air oven and fired while the fine powder stays in a flame or gas of a high temperature.

In the process for the preparation of micro inorganic foamed granules according to the invention, the amorphous residue is heated and foamed by the gas-stream firing method.

The amorphous residue having particle size of smaller than 150 $\mu$m. is sent with air into a heating device and passed through a flame generated by a burner or gas of high temperature generated in a hot-air oven so as to be melted or softened. Simultaneously, easily-foaming materials such as unburnt carbon and sulfides contained in the amorphous residue are converted into gas to produce a great number of voids.

Generally, the flame is hot enough to fuse or soften the amorphous residue and to gasify the foaming materials such as sulfide-sulfur and carbon. The amorphous residue, accordingly, can be foamed effectively. The amorphous residue effectively foam by introducing it into a flame of not lower than 900° C. It is preferred to introduce the residue into a flame of not lower than 1,000° C.

The amorphous residue can be also effectively foamed by introducing into a gas of high temperature not lower than 900° C. It is preferred to foam the amorphous residue by introducing it into a gas having a temperature of not lower than 1000° C.

The retention time of the amorphous residue in a flame or gas of high temperature is generally in the range of 1/1,000 to 1 sec.

Conventionally used carrier air and firing air can be also employed. Devices generally used in gas-stream firing method can be used. A burner comprising two tubes of different diameters which are arranged concentrically (double-tube burner).

The generated materials foamed and collected from the flame or gas of high temperature are introduced into a water, and a portion floating on the surface of the water is collected as micro inorganic foamed granules. By carrying out this procedure, the residue which does not sufficiently foam and has a specific gravity greater than 1 can be removed.

The micro inorganic foamed granules collected from water are generally dried at a temperature in the range of a room temperature to 100° C.

FIG. 1 is an electron microscopic photograph showing one example of the obtained micro inorganic foamed granules.

As shown in FIG. 1, the micro inorganic foamed granules respectively take a form of sphere having a particle size of not greater than 200 $\mu$m. More than 90% of granules (in terms of number of granules) have particle size in the range of 5 to 200 $\mu$m. Generally, approximately 20 to 80% (in terms of number of granules) of the micro inorganic foamed granules have a foam (void) which is open to the outside. The remaining micro inorganic foamed granules have an independent foam (void) having no opening connected to the outside.

The micro inorganic foamed granules prepared by the process of the invention comprise not more than 65 wt.% (preferably in the range of 63 to 30 wt.%) of $SiO_2$, not less than 15 wt.% (preferably in the range of 17 to 40 wt.%) of $Al_2O_3$, and not less than 5 wt.% (preferably in the range of 5 to 30 wt.%) of CaO.

The above three components are comprised in the micro inorganic foamed granules in a total amount of, generally, not less than 60 wt.%, preferably 70–95 wt.%, and most preferably 75–95 wt.%.

The micro inorganic foamed granules obtained by the process of the invention have particle size not larger than 200 μm, generally in the range of 5–150 μm.

In addition to the above three components, the micro inorganic foamed granules obtained by the process of the invention possibly contain iron oxide, MgO, $Na_2O$ and $K_2O$ in a total amount of, generally, not more than 40 wt.%, preferably 5–30 wt.%, and most preferably 5 to 25 wt.%. Preferably, iron oxide is contained in an amount of 2–15 wt.% (as $Fe_2O_3$), MgO is contained in an amount of 1–7 wt.%, $Na_2O$ is contained in an amount of 1–6 wt.%, and $K_2O$ is contained in an amount of 0–2 wt.%. Further, the micro inorganic foamed granules may contain a very small amount of $TiO_2$, $SO_3$, sulfide, other sulfur-containing compounds and carbon components.

The hydrostatic pressure strength of the micro inorganic foamed granules is generally more than 300 $kgf/cm^2$ measured at 70% of indestructibility ratio.

The apparent specific gravity thereof is generally in the range of 0.2 to 1.0. Apparent specific gravity can be adjusted by changing the content of the foaming component contained in the amorphous residue, the temperature of the flame or gas, and the retention time in the flame or gas.

Since the micro inorganic foamed granules prepared by the process of the invention have small particle size and high hydrostatic pressure strength, they are employable as adjustor for adjusting the specific gravity of cement used for an oil well or geothermal well. The apparent specific gravity thereof is within the suitable range for the above purpose. As the process of the invention employs the amorphous residue produced in a partial oxidation of coal, which has not find advantageous use until now, the micro inorganic foamed granules can be prepared at a lower cost by the process of the present invention compared with the conventional process.

The micro inorganic foamed granules obtained by the process of the invention can be also employed for other purposes such as heat insulating materials, lightweight aggregates for construction of buildings, extenders for fertilizer, detergent or paint, absorbents, soil improvers, etc.

The invention will be further described with reference to the following examples.

EXAMPLE 1

A residue collected from a coal gasification furnace according to a Texaco process was crushed in a bowl mill of small size so as to give particles having the largest granular size of not larger than 150 μm.

The X-ray diffraction analysis indicated that the employed residue was amorphous.

The crushed materials obtained in the above were then subjected to gas-stream firing by introducing together with air the materials into a flame of 1,200° C. prepared by a burner of a gas-stream firing device so as to be expanded.

The fired materials were put in water, and floating portion thereof was collected to dry at a room temperature.

FIG. 1 is an electron microscopic photograph showing a portion of the obtained micro inorganic foamed granules.

The mean particle size of the micro inorganic foamed granules was 60 μm., the smallest one was approx. 10 μm. and the largest one was approx. 200 μm.

The resulting micro inorganic foamed granules had an apparent specific gravity of 0.66 and hydrostatic pressure strength of 340 $kgf/cm^2$ (measured at 70% of indestructibility ratio). The chemical composition of the amorphous residue and that of the obtained micro inorganic foamed granules are set forth in Table 1.

The above measurements were made using the following process. The same measuring process were also utilized in the measurements in other examples of the invention.

MEASUREMENT METHODS

Apparent specific gravity: measured according to JIS-A-1134 and JIS-A-1135.

Analysis: made according to JIS-M-8852.

Hydrostatic pressure strength: measured according to a method for measuring a floatation ratio of hydrostatic pressure strength disclosed in pages 84–91 of 80th vol. of the bulletin edited by the Ceramic Industry Association (February, 1972).

TABLE 1

| Component | Amorphous Residue (wt. %) | Micro Inorganic Foamed Granules (wt. %) |
|---|---|---|
| ig. loss | 0.3 | 0.0 |
| $SiO_2$ | 59.1 | 59.4 |
| $Al_2O_3$ | 21.8 | 21.9 |
| $Fe_2O_3$ | 4.5 | 4.5 |
| CaO | 11.1 | 11.2 |
| MgO | 1.2 | 1.2 |
| $Na_2O$ | 1.3 | 1.3 |
| $K_2O$ | 0.5 | 0.5 |
| Unburnt carbon | 1.1 | 0.1 |
| Sulfide sulfur | 0.2 | 0.0 |

EXAMPLE 2

Micro inorganic foamed granules were prepared in the same manner as in Example 1 except that the amorphous residue was so crushed as to give particles having the largest particle size of 74 μm.

The mean particle size of the micro inorganic foamed granules was 40 μm, the smallest one was approx. 10 μm, and the largest one was 60 μm.

The apparent specific gravity of the obtained micro inorganic foamed granules was 0.71 and the hydrostatic pressure strength thereof was 370 $kgf/cm^2$ measured at 70% of indestructibility ratio.

EXAMPLE 3

Micro inorganic foamed granules were prepared in the same manner as in Example 1 except that the temperature of the flame of a burner of the gas-stream firing device was made 1,600° C.

The mean particle size of the micro inorganic foamed granules was 65 μm, the smallest one was approx. 10 μm, and the largest one was approx. 100 μm.

The apparent specific gravity of the obtained micro inorganic foamed granules was 0.87 and the hydrostatic pressure strength thereof was 360 kgf/cm$^2$ measured at 70% of indestructibility ratio.

We claim:

1. A process for the preparation of spherical micro inorganic foamed granules having a mean particle size of not larger than 200 μm wherein amorphous particles having a particle size of not greater than 150 μm recovered from particles of an amorphous residue produced by partial oxidation of a coal are heated by introducing the same into a flame or gas at a temperature of not lower than 900° C. for 1/1,000 to 1 second.

2. The process for the preparation of spherical micro inorganic foamed granules as claimed in claim 1, wherein the temperature of the flame or gas is not lower than 1,000° C.

3. The process for the preparation of spherical micro inorganic foamed granules as claimed in claim 1, wherein the heated particles are introduced into water and particles which float on the surface of water are collected.

4. The process for the preparation of spherical micro inorganic foamed granules as claimed in claim 1, wherein the amorphous particles comprise 65 wt.% or less of $SiO_2$, 15 wt.% or more of $Al_2O_3$, and 5 wt.% or more of CaO.

5. The process for the preparation of spherical micro inorganic foamed granules as claimed in claim 1, wherein the amorphous residue obtained by partial oxidation of coal contains sulfur in the form of sulfides and unburnt carbon in a total amount of not less than 1 wt.%.

6. The process for the preparation of spherical micro inorganic foamed granules as claimed in claim 1, wherein the amorphous residue is one collected from a furnace for coal gasification.

7. The process for the preparation of spherical micro inorganic foamed granules as claimed in claim 1, wherein the amorphous residue is a residue collected from a furnace for coal gasification in which the coal gasification is performed at a temperature of not lower than a softening point of an ash of a used coal.

* * * * *